United States Patent Office 2,739,874
Patented Mar. 27, 1956

2,739,874

METHOD OF RECOVERING SULFURIC ACID FROM ACID SLUDGE

William W. Reynolds, Concord, Calif., assignor to Shell Development Company, Emeryville, Calif., a corporation of Delaware No Drawing. Application October 13, 1951, Serial No. 251,246

4 Claims. (Cl. 23—173)

This invention relates to the recovery of sulfuric acid from acid sludges. More particularly, it is concerned with the sulfonation of petroleum oils and the recovery of sulfuric acid from the resulting acid sludges.

It is well known to treat petroleum oil with strong sulfuric acid to remove undesirable components therefrom and thereby improve certain qualities of the oil. In such a treatment there is formed an oil layer containing oil-soluble petroleum sulfonic acids and a sulfonation acid sludge. This sludge contains, in addition to spent sulfuric acid and water, varying amounts of organic impurities, particularly water-soluble sulfonic acids. The sludge oftentimes is originally highly viscous and, upon aging, becomes a hard mass due to the formation of polymers and tars by the reaction of the spent sulfuric and the organic contaminants contained therein. The unmanageability of sulfonation acid sludge and the presence of organic impurities therein precludes its use for various purposes, such as the manufacture of ammonium sulfate by reaction of ammonia with the acid content of the sludge. Therefore, sulfonation acid sludge is generally disposed of as waste. Not only is valuable sulfuric acid lost but sludge disposal also presents a major problem. Two disposal methods generally used for burning and dumping at sea. Obviously, a convenient and economical method for recovering usable sulfuric acid would be of material value to the industry.

It is known that a substantial portion of the organic contaminants may be removed from some acid sludges by diluting the same with water and separating the contaminants as a separate phase which may be decanted. However, the difficulties encountered in separating the organic contaminants from the dilute acid and the low yield of acid has made the recovery of sulfuric acid inconvenient and uneconomical. Furthermore, the resulting dilute acid is extremely corrosive to ordinary refinery equipment.

The principal object of the present invention is to provide a method for the recovery of the sulfuric acid content of acid sludges. Another object is to recover sulfuric acid from acid sludges containing organic sulfonic acids. Still another object is to recover sulfuric acid from acid sludges produced in the sulfonation of petroleum oils. Other objects and advantages will be apparent from the following description.

According to the present invention, it has been found that high recovery of sulfuric acid may be obtained from acid sludges by diluting such sludges, both with a hydrocarbon diluent and with sufficient water to cause formation of a hydrocarbon phase containing organic contaminants and an aqueous acid phase containing aqueous sulfuric acid having a concentration of about 60% to 75% effective acidity, as $H_2SO_4$. The term "effective acidity" is used to represent the following ratio:

$$\frac{\text{Weight percent } H_2SO_4}{\text{Weight percent } H_2SO_4 + \text{weight percent } H_2O} \times 100$$

A preferred embodiment of the present invention comprises recovering sulfuric acid from an acid sludge produced in the sulfonation of petroleum oils with concentrated sulfuric acid, which term is meant to include fuming acid or oleum, by diluting the sludge, in the presence of a substantial proportion, e. g., not more than about 50% by weight, based on the sludge, of a hydrocarbon diluent having an aromatic content of at least 65%, preferably 70% to 75%, with sufficient water to cause formation of a hydrocarbon phase containing organic contaminants and an acid phase containing aqueous sulfuric acid having a concentration of about 60% to 75% effective acidity.

Still another preferred embodiment of the present invention contemplates adding a portion or all of the water required to give a resulting sulfuric acid phase of 60–75% effective acidity, to the sulfonated petroleum mixture prior to sludge separation to effect partial separation of the non-settled sludge into an acid layer and a tar layer comprising organic contaminants, stratifying the mixture, separating a sulfonated oil layer from the acid and tar layers, diluting the acid and tar layers with a hydrocarbon diluent having an aromatic content of at least 65% and with additional water, if necessary, to cause formation of a hydrocarbon phase containing organic contaminants and an acid phase containing aqueous sulfuric acid having a concentration of about 60% to 75% effective acidity.

The invention is of particular utility for the treatment of viscous acid sludges which are produced in the sulfonation of lubricating oil distillates of substantial aromatic content, as well as extract or raffinate fractions of such distillates. Sludges from the sulfonation of relatively high boiling distillates containing from about 15% to about 50% aromatic-containing hydrocarbons, and which may be either monocyclics, dicyclic or polycyclic ring compounds, or mixtures thereof, and particularly from raffinates obtained from the distillate by selective solvent extraction, are usefully treated by the method of this invention. Particular reference can be made in this connection to lubricating oil distillate selective solvent raffinates from a relatively naphthenic or mixed base stock, which raffinates suitably have viscosity indices of from about 10 to about 65, preferably from about 25 to about 50.

In order that the invention will be better understood, a preferred embodiment thereof will be described in detail with particular reference to the recovery of sulfuric acid from an acid sludge produced in the sulfonation of a 30 V. I. furfural-raffinate of a bulk distillate having a viscosity of 60 SUS at 210° F. and obtained from a mixture of naphthenic and mixed base California crudes. The oil raffinate contained about 65% paraffins and naphthenes, about 20% monocyclic aromatics, about 13% dicyclic aromatics and about 2% of resins and polycyclic aromatics. It was pretreated with about 10% by weight of 98% sulfuric acid to remove a portion of the more reactive and undesirable highly aromatic materials. The mixture was permitted to settle and an oil layer was separated from a pretreat acid sludge layer. The pretreated oil was then contacted with about 35% by weight of fuming sulfuric acid (105.5% $H_2SO_4$) under sulfonating conditions. About 2 volumes of a light, substantially non-aromatic hydrocarbon diluent was added to the non-settled reaction mixture in order to effect the separation of unreacted oil and oil-soluble petroleum sulfonic acids from the spent sulfuric acid, water-soluble green sulfonic acids and other organic contaminants, such as polycyclic aromatics and resins. The diluted mixture was allowed to settle to obtain a top layer of hydrocarbon diluent containing unreacted oil and oil-soluble petroleum sulfonic acids and a bottom layer of sulfonation acid sludge containing spent sulfuric acid, water-soluble green sulfonic acids and other organic contaminants, such as polycyclic aromatics and resins, and the resulting layers were separated. Some reaction of the substantially non-aromatic diluent with sulfuric acid occurred resulting in the loss, by solution and reaction, of about 2–5% of the diluent to the acid sludge phase.

The pretreat acid sludge or the sulfonation acid sludge may be treated separately according to the present invention, or they can be admixed and treated together.

The sludge mixture was then diluted with about 20% to 25% by weight, based on the mixture, of a hydrocarbon diluent having an aromatic content of about 70–75%, for example, an $SO_2$-extract of a kerosene distillate, or a relatively highly aromatic catalytically cracked light gas oil or extract thereof, and with such an amount of water as to cause separation of a hydrocarbon phase containing water-soluble green sulfonic acids and other organic contaminants, such as polycyclic aromatics and resins, from a dilute, spent acid phase containing aqueous sulfuric acid having a concentration of about 60–75%, preferably about 70%, effective acidity. All of the aromatic hydrocarbon diluent separated in the upper phase with the organic contaminants. The resulting mixture was allowed to settle, and the resulting hydrocarbon phase and aqueous acid phase was separated, e. g., by decantation.

According to another preferred embodiment of the present invention, a petroleum oil was sulfonated according to the procedure described above. The resulting non-settled reaction mixture was combined with about 2 volumes of a light, substantially non-aromatic hydrocarbon diluent to effect the separation of unreacted oil and oil-soluble petroleum sulfonic acids from sulfonation acid sludge containing spent sulfuric acid, water-soluble green sulfonic acids and other organic contaminants, and with sufficient water to effect partial separation of the non-settled acid sludge into a tar layer containing organic contaminants and an acid layer containing sulfuric acid of about 65% acidity. The diluted mixture was allowed to settle to obtain a layer of hydrocarbon diluent containing unreacted oil and oil-soluble petroleum sulfonic acids, a tar layer and an acid layer. The hydrocarbon layer was separated from the tar and acid layers. The combined tar and acid layers were then mixed with pretreat acid sludge whereby the acidity of the acid layer was increased to about 70%. The resulting mixture was then combined with about 20% to 25% by weight, based on the mixture, of a hydrocarbon diluent having an aromatic content of about 70–75%, for example, an $SO_2$-extract of a kerosene distillate, or a relatively highly aromatic catalytically cracked light gas oil or extract thereof, to cause substantially complete separation of a hydrocarbon phase containing water-soluble green sulfonic acids and other organic contaminants, such as polycyclic aromatics and resins, from a dilute, spent acid phase containing aqueous sulfuric acid having a concentration of about 70% effective acidity. The resulting mixture was allowed to settle, and the resulting phases were separated.

The treatment of the acid sludge was preferably carried out in a completely closed system in order to substantially exclude oxygen therefrom. It was particularly desirable to minimize contact of the resulting hydrocarbon phase with oxygen.

In view of the high heat of dilution of concentrated sulfuric acid, it may be desirable to provide means for dissipating the heat generated in the dilution step in order to prevent the formation of solid or coking material. The temperature at which the diluted mixture is maintained varies with the type of sludge treated. In the foregoing illustration the diluted mixture was preferably maintained at a temperature of about 150° F.

The dilution of the acid sludge was preferably carried out substantially immediately after the withdrawal thereof from the sulfonation system. If the sludge is permitted to stand for any appreciable period of time at an elevated temperature, the organic contaminants react with the sulfuric acid with the formation of polymers and tars; the recovery of sulfuric acid therefrom then becomes very difficult if not impossible. Therefore, storage of the acid sludge should be avoided as far as possible.

By controlled water dilution of the acid sludge, decomposition of organic material by strong sulfuric acid is prevented, usable sulfuric acid solution separates from undesirable organic material, and corrosion of ordinary refinery equipment by dilute acid is prevented.

The hydrocarbon diluent used is preferably a predominantly aromatic hydrocarbon fraction or an aromatic hydrocarbon. It is preferred to employ a hydrocarbon or hydrocarbon mixture having an end boiling point below about 600° F., and an initial boiling point of at least about 280° F., preferably at least about 325° F. Suitable diluents include xylene, light catalytically cracked gas oil and solvent extracts of kerosene distillate.

To illustrate the advantages of using a hydrocarbon diluent, two batches of acid sludge were weighed out. Batch 1 was diluted with water alone, and Batch 2 was diluted with water in the presence of a solvent extract of a kerosene distillate. The results are shown in the following table:

|  | Batch 1 | Batch 2 |
|---|---|---|
| Sludge, gr | 200 | 200 |
| Water, gr | 30 | 30 |
| Kerosene extract, gr | 0 | 40 |
| Settling time, hr | 3 | 3 |
| Temperature, °F | 150 | 150 |
| Acid phase, gr | 59 | 115 |
| Acid recovered, gr | 39 | 76 |
| Acid recovered, percent | 42 | 81 |

It will be noted that almost twice as much sulfuric acid was recovered from the acid sludge when using a hydrocarbon diluent.

Another advantage accruing from the presence of an aromatic hydrocarbon diluent in the water dilution treatment is the reduction of viscosity of the resulting upper phase containing organic contaminants. For instance, when using water alone as in Batch 1 the resulting upper phase was a tarry mass having a viscosity over about 200,000 SSU at 140° F. Due to the extremely high viscosity, the upper, tarry phase was very difficult to handle and satisfactory separation thereof from the lower acid phase was virtually impossible. The use of the aromatic hydrocarbon diluent reduced the viscosity of the separated upper phase to about 21,300 SSU at 140° F. This upper phase is suitable for use as a fuel.

Under optimum conditions, over 90% of the total sulfuric acid content of the acid sludge can be recovered as usable sulfuric acid, and about 94% of the total amount of organic contaminants is concentrated in the upper, hydrocarbon phase. The recovered sulfuric acid is especially useful in the manufacture of ammonium sulfate.

Although the invention has been described in detail with reference to sulfonation acid sludges, it is likewise applicable to other acid sludges high in sulfonic acid content and to spent alkylation acid.

The claimed invention is:

1. A method for recovering sulfuric acid and useful hydrocarbon oil from a sulfuric acid sludge containing substantial amounts of organic contaminants, formed by sulfonating in a sulfonation zone a petroleum lubricating oil distillate containing from about 15% to about 50% aromatic-containing hydrocarbons by treatment with concentrated sulfuric acid, which method comprises admixing with said acid sludge substantially immediately after its withdrawal from said sulfonation zone not more than about 50% by weight, based on the sludge, of a hydrocarbon oil boiling in the range between 280° F. and 600° F. and having an aromatic content of at least 65% and sufficient water to reduce the concentration of the sulfuric acid in the sludge to a value of from about 60% to about 75% effective acidity, settling said admixture to form two separate liquid layers comprising a hydrocarbon phase containing said organic contaminants and an aqueous sulfuric acid phase, respectively, and separately recovering therefrom an acid suitable for use in the manufacture of ammonium sulfate and an oil suitable for use as a fuel.

2. The process of claim 1 wherein said petroleum lubricating oil distillate oil is a raffinate from a solvent extraction process.

3. The process of claim 1 wherein said petroleum lubricating oil distillate has a viscosity index in the range from 10 to 65.

4. The process of claim 1 wherein the amount of said hydrocarbon oil added to said sludge is between 20 and 50% by weight, based on the sludge.

References Cited in the file of this patent

UNITED STATES PATENTS

| | | |
|---|---|---|
| 1,092,386 | Pau et al. | Apr. 7, 1914 |
| 1,521,283 | Diggs | Dec. 30, 1924 |
| 1,919,664 | Merrill et al. | July 25, 1933 |
| 1,961,204 | Desy | June 5, 1934 |
| 2,050,345 | Liberthson | Aug. 11, 1936 |
| 2,064,549 | Lauer et al. | Dec. 15, 1936 |
| 2,079,424 | Read | May 4, 1937 |
| 2,304,280 | Read | Dec. 8, 1942 |
| 2,387,519 | Lillard et al. | Oct. 23, 1945 |
| 2,629,747 | Fuqua | Feb. 24, 1953 |